United States Patent [19]

Walling et al.

[11] 4,272,733
[45] Jun. 9, 1981

[54] BROADLY TUNABLE CHROMIUM-DOPED BERYLLIUM ALUMINATE LASERS AND OPERATION THEREOF

[75] Inventors: John C. Walling, Morristown; Robert C. Morris, Ledgewood; Otis G. Peterson, Dover, all of N.J.; Hans P. Jenssen, Belmont, Mass.

[73] Assignee: Allied Chemical Corporation, Morris Township, Morris County, N.J.

[21] Appl. No.: 43,513

[22] Filed: May 29, 1979

Related U.S. Application Data

[63] Continuation-in-part of Ser. No. 953,067, Oct. 20, 1978.

[51] Int. Cl.$^3$ ............................................... H01S 3/14
[52] U.S. Cl. ............................................... 331/94.5 F
[58] Field of Search ................... 331/94.5 F, 94.5 G, 331/94.5 H

[56] References Cited

U.S. PATENT DOCUMENTS

3,997,853  12/1976  Morris et al. ................ 331/94.5 F

Primary Examiner—William L. Sikes
Assistant Examiner—Léon Scott
Attorney, Agent, or Firm—James Riesenfeld

[57] ABSTRACT

A high power, broadly wavelength-tunable laser is provided which comprises as the laser medium particular single crystals of chromium-doped beryllium aluminate ($BeAl_2O_4$:$Cr^{3+}$) having the chrysoberyl structure, means for exciting the laser medium and tuning means. The laser may be operated over a broad temperature range from cryogenic temperatures to elevated temperatures. Elevated temperatures are preferred, however, since they result in higher laser gain. Emission is in a spectral range from red to infrared, and the laser is useful in the fields of defense, communications, isotope separation, photochemistry, etc.

21 Claims, 6 Drawing Figures

BROADLY TUNABLE CHROMIUM-DOPED BERYLLIUM ALUMINATE LASERS AND OPERATION THEREOF

CROSS-REFERENCE TO PRIOR APPLICATION

This application is a continuation-in-part of application Ser. No. 953,067, filed Oct. 20, 1978.

BACKGROUND OF THE INVENTION

1. Field of the Invention

This invention relates to lasers and, more particularly, to broadly tunable chromium-doped beryllium aluminate lasers and their operation.

2. Description of the Prior Art

Laser materials depend on their ability to absorb energy in such a way that more atoms (or molecules) are excited into a higher energy level than are in the terminal state, rendering the material capable of "stimulated" emission. If light of the appropriate wavelength is incident on such an excited material, it will stimulate emission of additional light having the same wavelength, phase, and direction as the incident light. This additional light, by augmenting the intensity of the incident light, demonstrates light amplification. Laser action was first demonstrated in 1960 using ruby ($Al_2O_3:Cr^{3+}$), a crystalline solid system. Since then, laser action has been achieved in gas, liquid, and glass systems as well as in other crystalline solid systems.

All lasers are wavelength tunable, although most can be tuned only over a bandwidth of less than a nanometer. Broadly wavelength-tunable lasers (i.e., those with a broad tunable range) are extremely useful in scientific and industrial applications, e.g. isotope separation, but have been primarily restricted to the liquid medium dye lasers. There exists, however, a little known category of broadly tunable solid-state host-type lasers referred to as "phonon-terminated" or "vibronic" lasers.

Dye lasers, the most common broadly tunable lasers, have several shortcomings. They are generally limited in average power capabilities because of thermal instability of their liquid host, which also necessitates, for high power application, auxiliary equipment to maintain dye flow. Their lifetime is limited by decomposition of the organic dye material. Some of the dyes and solvents are toxic and/or corrosive. In addition, dye lasers essentially cannot be Q-switched.

Host-type lasers employ a dopant ion incorporated in dilute concentration in a solid host as the laser-active component. Vibronic lasers are a variety of host-type lasers which derive their tunability from emission of vibrational quanta (phonons) concurrent with the emission of light quanta (photons). The energies of the photons and phonons which are emitted simultaneously in a vibronic laser add up to the energy of the associated purely electronic or "no-phonon" transition. The broad wavelength tunability of a vibronic laser derives from the broad energy phonon continuum which complements the photon emission.

Several vibronic lasers have been described by L. F. Johnson, et al. in "Phonon-Terminated Optical Masers," Phys. Rev. 149, 179, 1966. All of these suffer from severe tuning discontinuities associated with structure in their vibronic spectra. In addition, they must be operated at low temperatures. Room temperature vibronic laser emission has been observed in the infrared at 2.17 $\mu m$ in $Ho^{3+}$-doped $BaY_2F_8$ (L. F. Johnson and H. J. Guggenheim, "Electronic- and Phonon-Terminated Laser Emission from $Ho^{3+}$ in $BaY_2F_8$," IEEE J. Quantum Electron. QE-10, 442, 1974). The pulse threshold in this laser, however, is quite high—450 J. Room temperature vibronic laser emission in the vacuum ultraviolet has been predicted in $Nd^{3+}$-, $Er^{3+}$-, and $Tm^{3+}$- doped trifluorides (K. H. Yang and J. A. DeLuca, "VUV Fluorescence of $Nd^{3+}$-, $Er^{3+}$-, and $Tm^{3+}$-Doped Trifluorides and Tunable Coherent Sources from 1650 to 2600 Å," Appl. Phys. Lett. 29, 499, 1976) The anticipated tunable laser emission from these materials, however, would require laser pumping because of the short fluorescence lifetime.

A broad-band room temperature solid state laser operating in the visible has been reported, although tunable laser action has only been predicted. (R. W. Boyd, J. F. Owen and K. J. Teegarden, "Laser Action of M Centers in Lithium Fluoride," IEEE J. Quantum Electron. QE-14, 697, 1978).

Tuning the output wavelength of a tunable laser can be accomplished by including within the optical resonator any optical element with wavelength selective properties, so that only light having a certain wavelength will be favored for amplification by the active medium. The only restriction on the selection of this element is that it not introduce at the selected wavelength optical loss of such magnitude as to prevent laser oscillation. One example of such an element is a prism placed within the optical cavity between the laser medium and the mirror at one end. The prism refracts different wavelengths of light at different angles. For laser oscillation to be maintained between the end mirrors forming the optical resonator, the mirrors must be perfectly aligned so that reflected light is perpendicular to their surface. Thus, by pivoting one of these optical resonator mirrors relative to the light passing through the prism, it is possible to restrict laser oscillation to a limited and selectable part of the emission spectrum.

Alternative methods for tuning employ in place of the prism an adjustable optical grating or a birefringent filter consisting of one or more birefringent plates which can be pivoted or rotated to select the output wavelength.

Tuning can also be accomplished by placing at the output end of the laser a lens having longitudinal chromatic aberration. Moving the lens toward and away from the laser medium changes the wavelength of laser emission.

The spectral width of the emitted radiation can be controlled over a wide range by the judicious selection of tuning elements to be included within the resonator. By employing elements with successively narrower transmission bandwidths, e.g. multiple etalons, the laser output can be narrowed to a single oscillating mode of the laser resonator.

Bukin, et al. (Sov. J. Quantum Electron. 8(5), 671, May 1978) reported on stimulated emission from alexandrite at 77 K. Output wavelength was variable over a range of less than 0.5 nm altering the crystal temperature.

U.S. Pat. No. 3,997,853, issued Dec. 14, 1976 to R. C. Morris and C. F. Cline, discloses laser emission at a wavelength of 6804 Å (680.4 nm) from single crystals of trivalent chromium-doped beryllium aluminate oriented substantially along the a-c plane and having a $Cr^{3+}$ doping concentration ranging from about 0.005 to 1.0 atom percent. These crystals have the chrysoberyl structure, an orthorhombic structure that is isomorphous with olivine. The space group of the structure is Pnma with lattice parameters a=0.9404 nm, b=0.5476 nm, and c=0.4427 nm.

SUMMARY OF THE INVENTION

The term "alexandrite" as used in this specification is intended to mean trivalent chromium-doped beryllium aluminate ($BeAl_2O_4:Cr^{+3}$) of the chrysoberyl structure.

In accordance with the present invention, a broadly wavelength-tunable laser is provided which comprises a laser medium comprising a single crystal of alexandrite having a trivalent chromium doping concentration from about 0.002 to 10 atom percent with respect to aluminum sites; means for exciting said laser medium to emit coherent radiation; and tuning means for tuning said coherent radiation in a spectral range from red to infrared.

It was quite unexpected that the laser medium of this invention would be broadly wavelength-tunable. The R-line fluorescence of the laser medium, with peak output at 680.4 nm (FIG. 1) is similar to that of ruby, which lases at the wavelength of its R-line fluorescense. Laser emission in ruby is not considered to be broadly wavelength-tunable. Reasoning by analogy, the laser emission disclosed in U.S. Pat. No. 3,997,853 to be at 680.4 nm would likewise not be expected to be broadly wavelength-tunable. Moreover, the above-mentioned paper by Bukin, et al. not only reported emission at the $R_1$ line (at liquid nitrogen temperature), but specifically referred to the variability of the emission wavelength as being 679.87–680.33 nm, i.e., less than 0.5 nm, which would indicate that the laser is *not* broadly tunable. It was only after discovering that, in fact, the room temperature laser emission wavelength (using moderate excitation energy) is considerably longer than 680 nm and recognizing that this emission is in the vibrational sideband of the purely electronic transitions that the possibility of alexandrite being a broadly tunable laser medium was investigated and established.

Besides tunability, another advantage provided by the alexandrite laser medium is 4-level operation. A 4-level laser is a class of lasers characterized by the fact that the terminal level for the laser transition is not the ground state of the ion. In these lasers there can be little if any reabsorption of laser emission by the unexcited ground state ions within the laser host. This permits low threshold, high efficiency operation of the laser. In alexandrite, as in other phonon-terminated lasers, the laser transition involves the simultaneous emission of a photon and a phonon, so any reabsorption of this emission requires the simultaneous absorption of both quanta. The probability of this reabsorption is understandably low, so the observed threshold for alexandrite 4-level laser action is low.

The tunable laser of the present invention avoids the disadvantages of both tunable dye lasers and previously known vibronic lasers. High power operation can be achieved without need for auxiliary equipment; Q-switched operation is possible; and the laser medium is stable and neither toxic nor corrosive. Emission is partly in the visible portion of the spectrum.

In using the laser of this invention to generate tunable coherent radiation, it has been found unexpectedly that laser gain increases with increasing temperature. Thus, operation at elevated temperatures is preferred. If desired, however, ambient or sub-ambient temperatures may be employed.

DETAILED DESCRIPTION OF THE INVENTION

The laser medium employed in this invention comprises a single crystal of alexandrite having a trivalent chromium doping concentration from about 0.002 to 10 atom percent with respect to aluminum sites, 0 preferably from about 0.01 to 1.0 atom percent and more preferably from about 0.1 to 0.4 atom percent. The laser medium is excited by an optical pumping source and emits coherent radiation. Preferably the radiation is propagated in a direction substantially along the a-c plane of the crystal with the electric vector polarized substantially perpendicular to said a-c plane. Additional details concerning preparation and characteristics of the laser medium are disclosed in U.S. Pat. No. 3,997,853.

The laser medium of the present invention may be excited using any suitable optical pumping source, either incoherent or coherent and continuous (cw) or pulsed. Efficient excitation is particularly effected with wavelengths shorter than about 700 nm. Examples of suitable incoherent sources are gaseous discharge lamps filled with xenon and/or krypton, and designed to operate either cw or pulsed, and metallic vapor sources such as mercury, sodium, cesium, rubidium, and/or potassium. A cw mercury arc lamp has been found particularly suitable as a pumping source for cw laser operation, and a pulsed xenon arc lamp particularly suitable as a pumping source for pulsed laser operation.

Coherent pumping sources must have an emission wavelength that is absorbed by the ground state of $Cr^{3+}$ dopant ions but is not absorbed excessively by the excited state. For cw excitation the krypton ion and argon ion lasers are representative. For pulsed laser excitation, almost any coherent source having adequate power and an emission wavelength below 695 nm would be an effective pump for the present laser. Examples of suitable sources are doubled Nd:YAG, excimer lasers, and nitrogen lasers.

Any conventional tuning means may be used to tune the laser of this invention. Examples of suitable tuning means include a prism, optical grating, birefringent filter, multilayer dielectric coated filter or lens having longitudinal chromatic aberration. Particularly suitable is a birefringent filter of the general type described by G. Holtom and O. Teschke, "Design of a Birefringent Filter for High-Power Dye Lasers," IEEE J. Quantum Electron. QE-10, 577, 1974. This type of filter is sometimes referred to as a "Lyot filter". (B. Lyot, Compt. Rend. 197, 1593, 1933.

Figure 1:
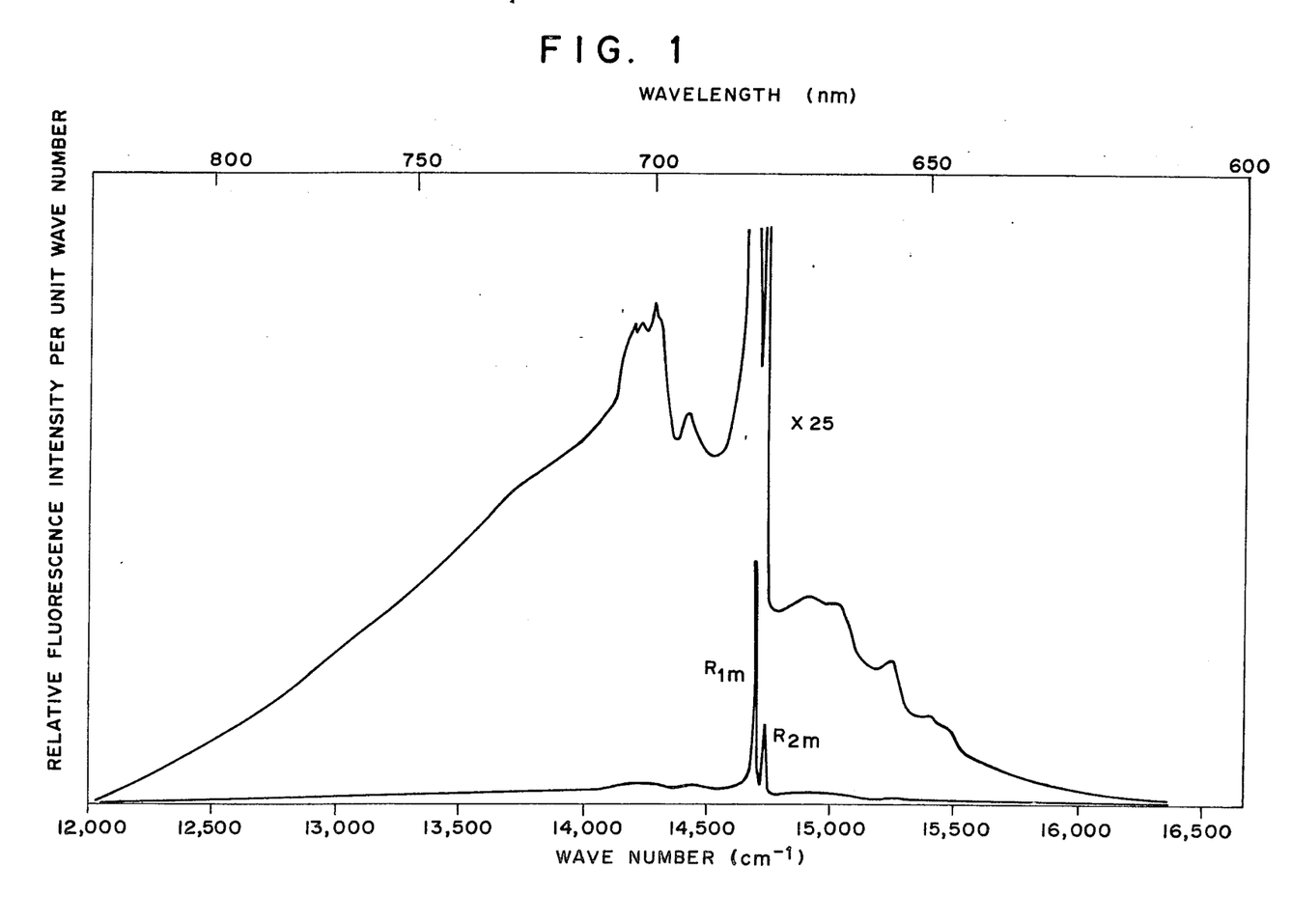
FIG. 1 shows the room temperature fluorescence spectrum of the alexandrite employed in this invention.

The tuning continuity of a vibronic laser depends upon a smooth vibronic profile. Sharp peaks in the vibronic profile result in significant power changes or discontinuities as the laser is tuned. FIG. 1 shows that at wavelengths above 720 nm the alexandrite vibronic spectrum at room temperature is smooth. This desirable property results because multiphonon processes are chiefly involved in this spectral region at room temperature and because several multiphonon combinations together produce the vibronic fluorescence. The peaks associated with phonon density of states and coupling strengths thus tend to average out.

The tunable range of the laser of this invention, while nominally about 700 nm to 820 nm, can be extended to both higher and lower wavelengths using high excitation energy. For example, by using high excitation energy, high gain lasing in the R-line (680.4 nm) was achieved. The wavelength range is also temperature dependent, with higher and lower wavelengths generally attained at elevated and reduced temperatures respectively. In addition, the wavelength range can be extended by several nonlinear methods, including frequency doubling and tripling, tuned-excitation parametric oscillators and Raman frequency shifting. Each of these nonlinear frequency shifting techniques gives a frequency-tuned output since the input frequency can be tuned.

Compared with ruby, the alexandrite vibronic laser of this invention has a low excitation threshold and low emission cross section. Alexandrite also has high mechanical strength and high thermal conductivity. These properties permit high average power operation, high overall efficiency, and high energy storage. They also make the present laser attractive for applications requiring high power, such as welding, machining and nuclear fusion.

Another potentially useful property of the present laser is the existence of dual sets of excited levels with substantially different fluorescence characteristics. As a consequence, the laser gain, bandwidth and storage time can be thermally tailored to a specific application. Specifically, elevating the laser medium temperature increases both gain and tuning range at the expense of decreased storage time and vice versa.

In operation, the laser of this invention is used to generate tunable coherent radiation. The process for operating the laser comprises activating the light source to excite the laser medium and adjusting the tuning means—for example, rotating a birefringent plate—to achieve the desired output wavelength. The laser optionally includes cooling means for temperature control; i.e. to maintain a desired temperature. For example, if the cooling means comprise a circulating fluid, the flow rate and temperature of the fluid can be adjusted to maintain the desired temperature. The circulating fluid may be air, water, a cryogenic liquid, etc. Preferably, a heater is used to control the fluid temperature when necessary.

The present invention contemplates laser operation at temperatures in the range from about 77° K. and below to elevated temperatures up to about 500° C. Surprisingly, tests tend to indicate that laser gain increases with temperature up to about 200° C. Above 200° C., non-radiative quenching might reduce laser gain. Thus, the preferred temperature range is between about ambient and about 200° C.

The present laser has many potential applications in the communications field. It can be tuned over a much wider wavelength range and can emit much greater power than the diode lasers most often used for these purposes. The laser crystal has a much longer useful life than junction diodes. Since the output wavelength can be changed, it can be tuned away from the characteristic absorption in an optical fiber used for communication, thus obtaining advantage in efficiency.

In summary, the laser of this invention provides a unique combination of advantages. On the one hand it provides high average power, efficiency and energy storage together with Q-switching capabilities. On the other hand it provides broad wavelength tunability.

Figure 2:
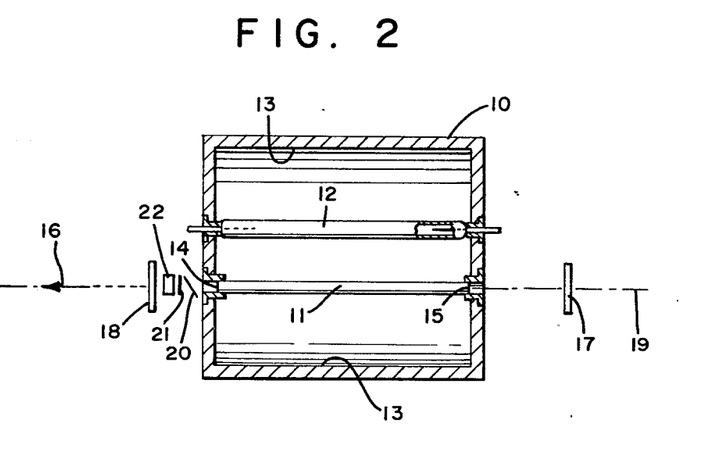
FIG. 2 is a diagrammatic illustration in partial cross section of a typical laser apparatus utilizing a laser rod together with tuning means to provide the tunable laser of this invention.

FIG. 2 illustrates a tunable laser apparatus of this invention. The laser medium 11, comprising an alexandrite crystal of this invention and pumping source 12, e.g. a cw mercury or a pulsed xenon gaseous discharge pumping source, are housed in container 10 which has a highly reflective inner surface 13 which defines an elliptical cavity. Reflection at surface 13 may be diffuse or specular. The axes of the laser medium 11 and the pumping source 12 are each located along a focal line of the ellipse formed by container 10. Laser medium 11 is normally provided with coated ends 14 and 15 having a conventional dielectric anti-reflection coating. Completely reflecting mirror 17, tuning element 20, and partially reflecting mirror 18 are positioned external to container 10 about cylindrical axis 19 of laser medium 11. Lasing action is evidenced by emission of highly collimated coherent radiation whose wavelength is determined by the orientation of the tuning element 20. The radiation, shown as arrow 16, emanates from partially reflecting mirror 18. Mirrors 17 and 18 may both be partially reflecting.

If necessary to attain the desired operating temperature, laser medium 11 and pumping source 12 are cooled by a fluid circulated through container 10. This fluid may be air, water, or a cryogenic liquid, and optionally may be preheated by conventional means to achieve better temperature control.

Optionally, the laser may include means for Q-switching. These means may comprise a saturable dye absorber, an acousto-optic Q-switch or, as shown in FIG. 2, a polarizer 21 and a Pockels cell 22 placed in the beam path. Polarizer 21 may be omitted, particularly at low excitation power. The Q-switch "spoils" the Q of the cavity for an interval of time during which energy is stored. At the appropriate moment the Q-switch is turned to the high gain condition, and the stored energy in the medium is suddenly released in a "giant pulse" of very short duration. The laser may also be mode-locked.

Figure 3:
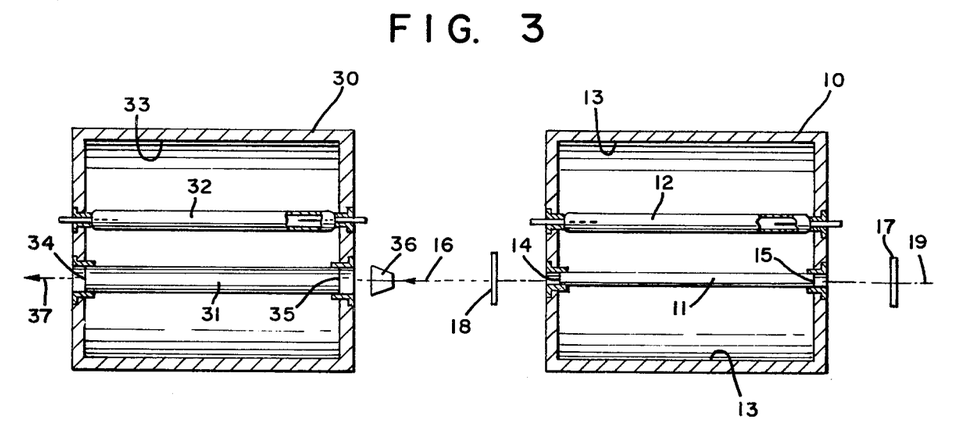
FIG. 3 is a schematic illustration of an oscillator-amplifier laser system.

As shown in FIG. 3, an amplifier stage may be used with the apparatus of FIG. 2 in a high power laser system of this invention. The apparatus of FIG. 2 is then considered the "oscillator stage" of the amplifier. The amplifier stage is located in the output beam of the oscillator stage. It consists essentially of a container 30 which has a highly reflective inner surface 33 which defines an elliptical cavity. An amplifier rod 31, excited by flash lamp 32, is normally provided with coated ends 34 and 35 having a conventional dielectric anti-reflection coating. The amplifier rod may be of larger diameter than the oscillator rod 11, in which case a beam expanding telescope 36 is located between the stages in order to match the beam size to the rod size. Unlike the oscillator stage, the amplifier stage normally does not have mirrors at its ends to form a cavity, and the amplification of the oscillator output occurs during only one pass of the laser beam through the amplifier rod. However, for some applications, the amplifier may be fitted with partially reflecting mirrors to feed back part of the amplifier output into the amplifying medium. The spectral and temporal characteristics of the output of this regenerative oscillator can then be determined by injecting a suitably tailored signal from the primary oscillator in a manner similar to that employed with the single pass amplifier. More than one amplifier stage may be used. The amplified output shown as arrow 37 emanates from amplifier rod 31.

Figure 4:
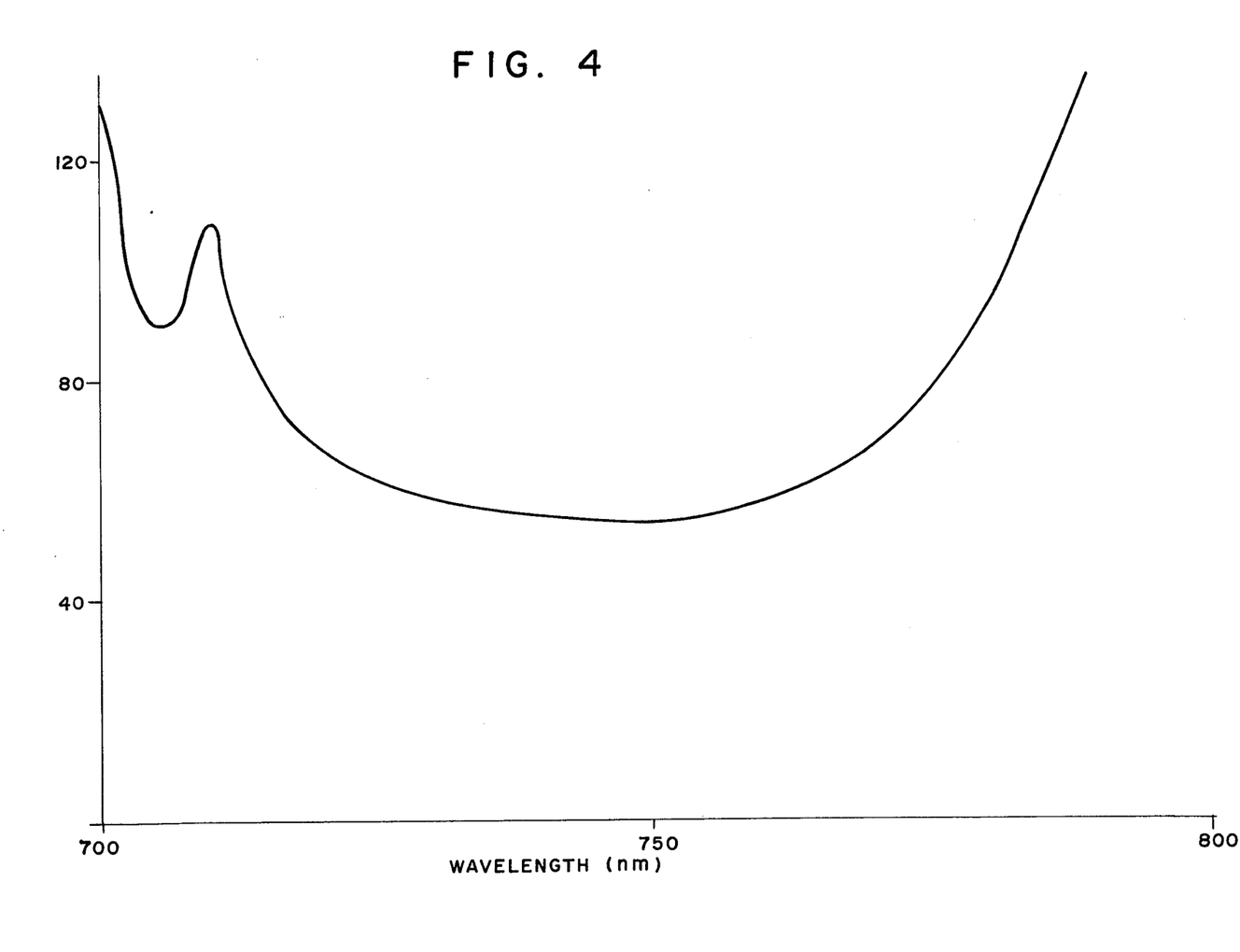
FIG. 4 is a plot of threshold energy for pulsed lasing vs. wavelength for the tunable laser of this invention.

FIG. 4 is a plot of threshold energy for pulsed lasing vs. wavelength, illustrating the broad range of continuous tunability and the relatively low threshold energy of the tunable laser of this invention.

Figure 5:
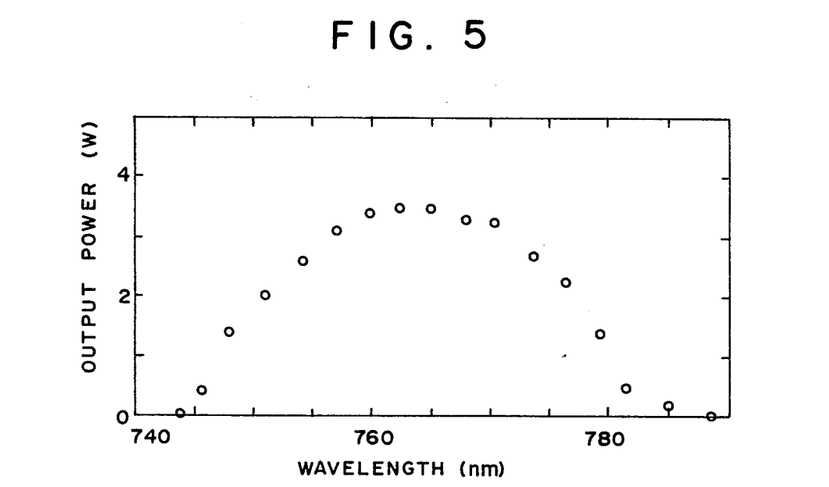
FIG. 5 is a plot of output power vs. wavelength for constant cw input power of the tunable laser of this invention.

FIG. 5 shows the dependence of output power on wavelength for constant cw excitation power of the tunable laser of this invention. The wavelength range is shown to be somewhat narrower than for the pulsed mode; however, this simply reflects the generally lower efficiency of cw operation.

Figure 6:
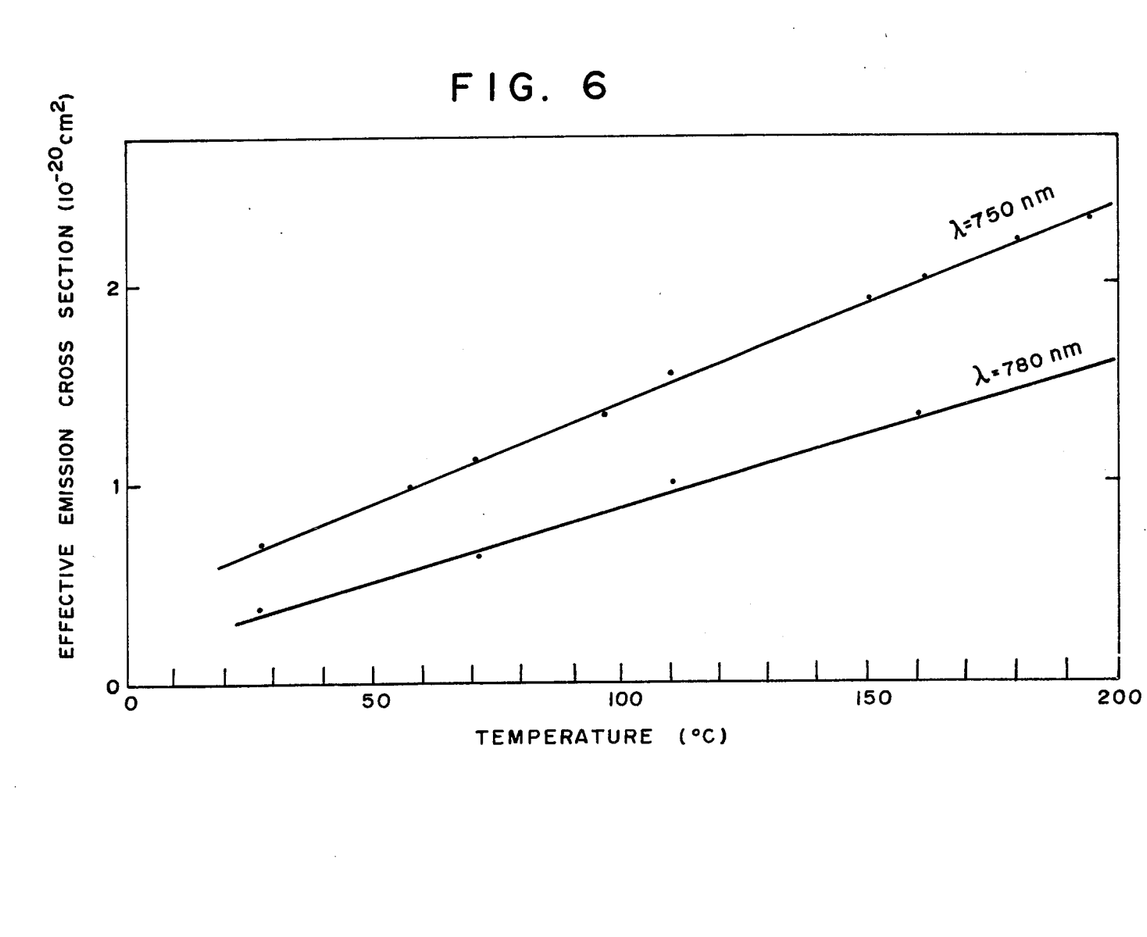
FIG. 6 is a plot of the temperature dependence of the effective emission cross section of the tunable laser of this invention for lasing at 750 and 780 nm.

FIG. 6 shows that emission cross section at 750 and 780 nm, and hence laser gain, of the laser of this invention increases with temperature. This behavior is rare in lasers and permits improved energy extraction in Q-switched and amplifier operation.

EXAMPLES

Example 1 illustrates the prior art alexandrite laser without the use of a tuning means. The other examples illustrate the tunable lasers of this invention.

1. A single crystal of [001] (c-axis) oriented alexandrite containing 0.02–0.03 atom percent $Cr^{3+}$ was prepared by the Czochralski technique from a stoichiometric melt contained in an iridium crucible under flowing nitrogen atmosphere. A c-axis rod of dimensions 7.5 cm long and 0.63 cm in diameter was prepared from the above crystal. The rod was pumped with a single linear xenon flashlamp in a water-cooled, silver-coated elliptical cross section cavity which had an active length of 5.72 cm. Flash duration was 100 $\mu$s. Laser emission was observed between 720 nm and 726 nm at 35 J input, shifting to slightly shorter wavelength when pumped with 50 J. A 28 J threshold was observed with mirrors reflecting 98% at the laser frequency.

2. A c-axis single crystal rod of alexandrite containing 0.03–0.04 atom percent $Cr^{3+}$ achieved 300 mJ output for 130 J delivered to the lamp in a 250 $\mu$s. pulse from a xenon flash lamp. The slope efficiency was about 0.38%, and the effective emission cross section implied by laser tests was $1.04 \times 10^{-20}$ cm$^2$ at the frequency of optimum lasing, 750 nm. The laser was continuously tuned between 701 and 794 nm utilizing a "Lyot" birefringent filter comprising three parallel birefringent plates mounted within the optical cavity at Brewster's angle with respect to light reflected within the cavity. The threshold for laser oscillation as a function of wavelength in this configuration is shown in FIG. 4.

3. A 0.3 cm diameter $\times$ 7 cm long c-axis single crystal rod of alexandrite containing about 0.2 atom percent $Cr^{3+}$ was placed with its axis along one focal line of a water-cooled, silver-coated, elliptical cross section pump cavity. A 3 kW ac mercury arc lamp was placed with its axis along the conjugate focal line of the cavity. The lamp was powered with a ballast transformer. 98% reflective mirrors with 4 m concave front surfaces were spaced 30.5 cm apart to form a stable resonator from which laser action was obtained at the crests of the pump light curve. The laser was continuously tuned between 742 and 783 nm with a Lyot biregringent filter. Maximum output occured at 756 nm with 0.02 nm linewidth. The threshold for laser action at 756 nm was about 1.5 kW and the slope efficiency was about 0.8%. Maximum output power was 6.5 W.

4. A 0.64 cm diameter $\times$ 9.6 cm long c-axis single crystal rod of alexandrite containing 0.12 atom percent $Cr^{3+}$ was pumped with a linear xenon flashlamp in a water-cooled, silver-coated, elliptical cross section cavity 76 cm long. The end mirrors were about 30 cm apart. The ends of the rod were uncoated and had reflectivities of about 7%. The mirrors, one flat and one 4 m concave, were aligned parallel to the rod faces. The temperature dependence of both output and threshold were determined in the range 17° C. to 65° C. Within that range the increase in output (at constant input) and decrease in threshold were essentially linear with increasing temperature.

We claim:

1. A broadly wavelength-tunable laser comprising:
   (a) a laser medium comprising a single crystal of beryllium aluminate of the chrysoberyl structure having a trivalent chromium doping concentration from about 0.002 to 10 atom percent with respect to aluminum sites;
   (b) means for exciting said laser medium to emit coherent radiation;
   (c) tuning means for tuning said coherent radiation in a spectral range from red to infrared; and
   (d) mirrors forming an optical resonator, said resonator enclosing the laser medium and tuning means and adapted for maintaining laser oscillations between the mirrors.

2. The laser of claim 1, in which the chromium doping concentration ranges from about 0.01 to 1.0 atom percent.

3. The laser of claim 1 in which the chromium doping concentration ranges from about 0.1 to 0.4 atom percent.

4. The laser of claim 1 in which the crystal is oriented such that the coherent radiation is propagated in a direction substantially along the a-c plane of the crystal.

5. The laser of claim 1 in which the tuning means is a birefringent filter rotatably mounted within the optical resonator.

6. The laser of claim 1 in which the tuning means is a prism and at least one of the mirrors is pivotably mounted.

7. The laser of claim 1 in which the tuning means is an optical grating rotatably mounted within the optical resonator.

8. The laser of claim 1 in which the tuning means is a multilayer dielectric coated filter rotatably mounted within the optical resonator.

9. The laser of claim 1 in which the tuning means is a lens having longitudinal chromatic aberration slidably mounted within the optical resonator.

10. The laser of claim 1 in which the means for exciting said laser medium comprises a pulsed incoherent light source emitting at wavelengths shorter than about 700 nm.

11. The laser of claim 10 in which the light source comprises a xenon arc lamp.

12. The laser of claim 1 in which the means for exciting said laser medium comprises a continuous incoherent light source emitting at wavelengths shorter than about 700 nm.

13. The laser of claim 12 in which the light source comprises a mercury arc lamp.

14. The laser of claim 1 in which the means for exciting said laser medium comprises a pulsed coherent light source emitting at wavelengths shorter than about 700 nm.

15. The laser of claim 1 in which the light source comprises a continuous coherent light source emitting at wavelengths shorter than about 700 nm.

16. The laser of claim 1 further comprising means for Q-switching said laser.

17. The laser of claim 14 in which the Q-switching means comprises a Pockels cell.

18. The laser of claim 14 in which the Q-switching means comprise a Pockels cell and a polarizer.

19. The laser of claim 1 further comprising mens for cooling said laser medium.

20. The laser of claim 17 in which the cooling means comprises a circulating fluid.

21. The laser of claim 18 in which the cooling means further comprises means for adjusting the temperature of the circulating fluid.

* * * * *

UNITED STATES PATENT AND TRADEMARK OFFICE
CERTIFICATE OF CORRECTION

PATENT NO. : 4,272,733
DATED : June 9, 1981
INVENTOR(S) : John C. Walling, Robert C. Morris
Otis G. Peterson and Hans P. Jenssen It is certified that error appears in the above-identified patent and that said Letters Patent are hereby corrected as shown below:

Col. 8, line 36, after "1", delete --,--

Col. 10, line 1, "14" should be --16--
Col. 10, line 3, "14" should be --16--

Col. 10, line 5, "mens" should be --means--

Col. 10, line 7, "17" should be --19--
Col. 10, line 9, "18" should be --20--

Signed and Sealed this

First Day of September 1981

[SEAL]

Attest:

Attesting Officer

GERALD J. MOSSINGHOFF

Commissioner of Patents and Trademarks